United States Patent

Martin et al.

[11] Patent Number: 6,013,347
[45] Date of Patent: Jan. 11, 2000

[54] METHOD OF CONTINUOUS TONE IMAGING TO PROVIDE AN IMAGED HIGH LOFT MAT PRODUCT

[75] Inventors: Philip G. Martin, Forest Lake; Gary L. Olson, Woodbury; Gerald A. Ridlehoover, White Bear Township; Randall R. Schickler, Lakeville, all of Minn.

[73] Assignee: 3M Innovative Properties Company, St. Paul, Minn.

[21] Appl. No.: 08/895,416

[22] Filed: Jul. 16, 1997

[51] Int. Cl.⁷ .......................................................... B32B 3/02
[52] U.S. Cl. ................................ 428/92; 428/88; 428/89; 428/97; 604/361; 8/14; 8/62
[58] Field of Search ................................ 156/167, 181; 428/195, 371, 92, 88, 89, 97; 8/14, 16, 62, 148, 149; 101/483; 604/361; 385.1

[56] References Cited

U.S. PATENT DOCUMENTS

| | | | |
|---|---|---|---|
| 3,148,101 | 9/1964 | Allman et al. | 156/167 |
| 3,288,582 | 11/1966 | Wong et al. | 65/3 |
| 3,314,840 | 4/1967 | Lloyd et al. | 156/167 |
| 3,341,394 | 9/1967 | Kinney | 101/72 |
| 3,468,694 | 9/1969 | Moritz et al. | 117/37 |
| 3,512,230 | 5/1970 | Luzzatto et al. | 28/1.2 |
| 3,512,914 | 5/1970 | Flecscher | 8/7 |
| 3,542,615 | 11/1970 | Dobo et al. | 186/181 |
| 3,963,428 | 6/1976 | Stark | 8/14 |

*Primary Examiner*—Merrick Dixon
*Attorney, Agent, or Firm*—Michaele A. Hakamaki

[57] ABSTRACT

A method for continuous tone imaging on a mat product having a web material with a three dimensional open structure provides a mat product with a sufficiently clear image. Moreover, it is a specific aspect of the present method to provide a clear image on such a three dimensional structure without negatively affecting the characteristics of the web material having the three dimensional structure. More specifically, the present invention is directed to a method for imaging a flexible high loft matting material which can be used in providing a floor covering mat product. The present invention is also directed to the imaged mat product produced in accordance with this method.

12 Claims, 7 Drawing Sheets

METHOD OF CONTINUOUS TONE IMAGING TO PROVIDE AN IMAGED HIGH LOFT MAT PRODUCT

TECHNICAL FIELD

The present invention relates to an imaging process for applying a color image to a high loft mat material. More specifically, the image is applied to the three dimensional structure of a high loft mat material in a way so as to provide a clear full color continuous tone image which does not degrade the functional attributes of the mat material.

BACKGROUND OF THE INVENTION

High loft composite materials have long been known which are suitable for use as matting material. Many types have been developed, and the present invention is particularly directed to those of the type having a three dimensional open structure for providing high loft.

The present invention was particularly developed for its application to matting material comprising an open structure of interengaged continuous, coiled filaments of thermoplastic material. Such a structure provides a resilient, crush resistant and tough unitary open structure that is dimensionally stable. In some cases, the matting material is characterized further by having a higher density adjacent one flattened side thereof (a result of the mat making process), wherein coils of the filaments are spot-bonded to one another to provide the open dimensionally stable structure. This can be enhanced by applying a bonding resin to coat the filaments of the web. More preferably, the open web material is laminated (on its higher density flattened side) to a solid and/or porous flexible layer to provide an even more highly dimensionally stable laminate which is especially suitable for use as a floor covering.

Having a relatively soft feeling but resilient crush resistant open structure is desirable for use as such a floor matting because the openings are capable of trapping dirt and other small particles. Moreover, an open stable structure allows such a mat to be easily cleaned while permitting rapid drying. Moreover, the matting must be able to retain this open structure for a long enough time to provide a sufficient useful life. Mats in accordance with the above have been commercially available from Minnesota Mining and Manufacturing Company of St. Paul, Minn. as Nomad™ floor mats.

It has long been desirable to provide imaging to such a matting material. Basic imagery, such as single color emblems, logos, and the like, have been done in a limited number of ways. For example, attempts were made long ago to utilize surface printing techniques whereby a dye was applied onto the surface of the open loop structure described above. Examples of surface printing techniques that were attempted include silk-screen printing and sponge block dying. These attempts were highly unsuccessful in that the dyes migrated substantially into the web material and diffused within its structure to the point where the image sharpness was not acceptable.

Then, a more satisfactory solid color image was obtained by the use of pigmented coatings, such as vinyl inks or paints that were sprayed through a stencil, the stencil defining the desired image. However, the problem with such an imaged mat was that the image was not nearly as durable as the structural durability of the mat and wore off much more quickly than the mat wore out. Moreover, such coatings that were sprayed through the stencil substantially altered the characteristics of the mat itself in that portion to which the pigmented coating was applied. Specifically, the void volume of the open spaces was significantly decreased, thus taking away from the mat's ability to hold dirt and water and rendered the mat significantly heavier. The resiliency and feel of the mat in the printed areas were also degraded.

Another way of providing an image within this type of mat material was developed whereby mattings of different colors were combined in a predetermined pattern. Specifically, a web structure would be modified by cutting out a particular pattern or image (logo, emblem, etc.) from the web material and then inserting different color shaped web material within the cut out portions. These inserts would then be bonded in place. The result is a mat having solid color imaging without changing the character of the mat material. That is, as long as the inserts were of similar but different color material, the mat properties would remain substantially unchanged. The images obtainable are limited to relatively simple images that can be made by this method. The more significant disadvantage, however, lies in that the expense of producing such a mat is significantly higher, and generally in that the additional processing steps intensifies the entire process.

A similar manner of providing an image on such a matting material can also be accomplished by merely changing the appearance of the mat material in the shape of the specific desired image, but out of the same material. For example, a patterned heating element can be applied against the low density surface of the mat material in order to melt an image into the mat material. Although an image may be obtained, the mat characteristics in the treated region are significantly changed. Moreover, the image is not as distinct as one obtained by the use of different colors.

The present invention relates to the applicability of other imaging techniques that have heretofore not been acceptable for imaging on substrates having a significant three dimensional aspect, such as the above described matting material, which includes an open top surface and a significant void volume within the material structure. For example, ink jet printers and other air-brush multicolor spraying equipment have been developed on a large scale for providing images to large sheet-like materials. These ink jet and air-brush spraying apparatuses have heretofore been used in the imaging of substantially flat surfaces, and more particularly, to apply an image to a surface of the sheet material.

For example, a large ink jet printer has been available and is known as a SCITEX™ Outboard ink jet printer which is capable of printing on substrates up to about five feet in width. Currently, even larger ink jet printers are available from Nur Advanced Technologies Ltd. of Petach Tikva, Israel. Such machines are designed specifically for use to print materials such as paper, Tyvek™, PVC, vinyl, knit vinyl, Panaflex™, mesh PVC, cloth, canvas and other fabrics. In these suggested materials, a substantially even or flat surface is defined in each case, wherein the pigments are intended only to be applied at or near the surface to be imaged, or it is merely the intent to provide the image to only the surface feature (for example, in the case of a mesh or netting) where no lower structure is intended to be printed. Moreover, the materials suggested are not three dimensional structures in the sense of being open from the top surface and which include high void volumes within the thickness of the materials. These printing apparatuses have not been designed or suggested for use on a substantial three dimensional substrate.

Ink jet printers are also known to be used for providing imaging to carpeting. Carpeting is, however, very different from the three dimensional material suitable for use in accordance with the present invention. Carpeting, although it may provide a three dimensional surface (e.g. a sculpted surface), presents a rather closed surface. Thus, for printing, an image is provided to a substantially closed surface, whereby the image is made up of ink primarily applied to the surface (although possibly at more than one level), as opposed to ink applied within the depths of its structure.

Carpeting does not exhibit an open three dimensional structure having an open top surface and high void volume within the thickness of the material. Such an open three dimensional structure is important for use in accordance with the present invention as a matting material because of its dirt or particle hiding capability. An open top surface is important for the ability of the material to receive dirt particles. Moreover, the open high void volume of the material within its thickness is important because it gives the material the ability to receive, hold and obscure dirt particles therein. In other words, receiving the dirt particles is one important function, but the ability to hide dirt is highly desirable.

In fact, conventional knowledge suggests that an image can not be clearly provided on a substantial three dimensional open structure since the apparatuses are designed to apply the image at a specific planar surface. Further in this regard, these high tech printers require a digitized image (which can be provided in any number of ways). The image is broken down into the three or four colors to be applied in the case of a full color printing system and the colors are laid down in sequence based on the control of the apparatus in accordance with the color components making up the digitized image. The image itself is also broken down into pixels which become corresponding portions of the printed image on the large material to make up the printed image. For example, ink jet printers are known to apply a number of pixels per inch (10 or 20 is common), and a pixel itself comprises a matrix (e.g. seven by seven) of dots. Each pixel includes a portion of the stored overall image and corresponds to a similar but enlarged pixel to be defined on the substrate at a specific surface.

SUMMARY OF THE PRESENT INVENTION

In accordance with the present invention, a method has been developed for continuous tone, and preferably full color, imaging on a three dimensional structure of a web material. A continuous tone image, as used herinafter, is an image having a virtually unlimited range of colors or shades of one color that can be visually perceived. Moreover, it is a specific aspect of the present method to provide a clear image on such a three dimensional structure without negatively affecting the characteristics of the web material having the three dimensional structure. As used throughout this application, image clarity refers to image sharpness or acuity, not to transparency. More specifically, the present invention is directed to a method for imaging a flexible high loft matting material which can be used in providing a floor covering mat product. The present invention is also directed to the imaged mat product produced in accordance with this method.

The aforementioned advantages are achieved, in a first aspect, by a method of continuous tone imaging to provide a three dimensional image to a high loft mat product, comprising the steps of: providing a high loft web material having a first major surface and a three dimensional open structure that extends at least partially within the thickness of the web material from the first major surface, the first major surface characterized by having an open structure, and the three dimensional open structure having printable surfaces thereof provided at various levels within the thickness of the web material; imaging a first portion of the web material by spraying at least one color ink from a spray device toward the first major surface of the first portion during relative movement between the first portion and the spray device; and controlling the spray in accordance with a predetermined pattern and thereby applying the ink to the printable surfaces at various levels within the three dimensional open structure of the web material to produce a three dimensional continuous tone image portion on the web material, but without substantially changing the void volume.

Preferably, the method also includes the steps of indexing the web material with respect to the spray device so that a next portion of the web material can be imaged, imaging the next portion by spraying at least the one color ink from the spray device toward the first major surface of the next portion during relative movement between the next portion and the spray device, controlling the spray also in accordance with the predetermined pattern and thereby applying the ink at various levels within the three dimensional open structure of the web material to further produce an adjacent three dimensional continuous tone image portion on the web material, and repeating the indexing and spraying until a desired image is effectively produced on and within the three dimensional open structure of the web material.

Furthermore, the method also preferably includes a step of bonding the web material to a flexible substrate before the imaging step. The method may be used to apply the ink onto portions of an open three dimensional structure that is open throughout its thickness and to portions of a surface of the flexible substrate. Alternatively, ink may be applied to a web material that is more dense within its thickness at a region thereof adjacent to an interface between the web material and the flexible substrate, whereby ink is applied onto portions of the open three dimensional structure above the densified region and to portions of the densified region that faces the spray device. Preferably, the web material is further coated with a protective coating for improved durability of the mat and its image. The provided web material preferably comprises a white web material portion onto which the imaging step is conducted. The web material may itself be composed of a white material, or may be rendered white by another process step. Instead, the web material may comprise a colorless material with a white flexible substrate bonded to the web material.

More preferably, the method comprises a color continuous tone imaging process whereby plural different color inks are applied from which at least one other color is perceived. Most preferably, three different transparent color inks are applied to each portion of the web material so that a full color continuous tone image can be produced. The applied image may be stored as a digitized image within an electronic control system. Moreover, the indexing step and the spraying operation of the imaging steps are preferably controlled so that an overlap area is provided of a same color in the direction of movement of the spray device relative to the web material on the three dimensional open structure at a level within the thickness of the web material. The overlap can be produced by spraying a diverging ink stream from a colored ink jet, and indexing the web material relative to the ink jet so that after a first spray pass of the ink jet over the first portion of the web material, the next portion of the web material is positioned so that during a next pass of the colored ink jet, the overlap area is formed. Thus, the first major surface can be effectively imaged. In addition to or alternatively, the overlap can be formed by spraying diverging ink streams from plural same colored ink jets, where the plural ink jets are relatively positioned on the spraying device so that during a first spray pass of the ink jet over the first portion of the web material, the overlap area is formed by adjacent same colored ink jets. Again, the first major surface of the first portion can be effectively imaged.

In accordance with another aspect of the present invention, a continuous tone imaged high loft mat product is provided that comprises a high loft web material having a first major surface and a three dimensional open structure that extends at least partially within the thickness of the web material from the first major surface, the first major surface characterized by having an open structure, and the three dimensional open structure having portions thereof provided at various levels within the thickness of the web material, and a continuous tone image applied over at least a portion of the mat material comprising at least one color of ink applied at various levels within the three dimensional open structure of the web material, wherein the void volume of an imaged portion of the web material that has ink applied thereto for defining the image is substantially similar to the void volume of three dimensional open structure of a non-imaged portion of the web material.

Preferably, the imaged mat product includes a flexible substrate bonded to the web material. The imaged mat product may comprise web material that includes an open three dimensional structure all the way through its thickness with the ink applied onto portions of the open three dimensional structure throughout its thickness and to portions of a surface of the flexible substrate. Alternatively, the imaged mat product may include web material having an open three dimensional structure extending partially through its thickness, and which is more dense within its thickness at a region thereof adjacent to an interface between the web material and the flexible substrate. The ink can then be applied onto portions of the open three dimensional structure above the densified region and to portions of the densified region that face away from the interface. The web material preferably comprises a white web material portion onto which the image is applied. The web material may itself be composed of a white material or may be rendered white. Instead, the web material can be composed of a colorless material with a white flexible substrate bonded to the web material.

More preferably, a continuous tone color image comprises plural different color inks that are applied and from which at least one other color is perceived. Most preferably, the image comprises a full color image including at least three different color transparent inks applied to the web material so that a continuous tone image is produced. The effective image produced in accordance with the present invention includes a characteristic overlap area of a same color in one direction of the web material on the three dimensional open structure at a level within the thickness of the web material so that the first major surface of the web material is effectively imaged.

DETAILED DESCRIPTION OF THE PREFERRED EMBODIMENTS

In accordance with the present invention, a method has been developed for continuous tone, and preferable full color, imaging of a flexible three dimensional mat material. A continuous tone image is an image having a virtually unlimited range of colors or shades of a single color. A specific composite mat to which the present invention is applicable is that disclosed in commonly owned U.S. Pat. Nos. 3,837,988 and 4,351,683, the entire disclosures of which are incorporated herein by reference. A brief description of such a web material is as follows.

Figure 2:
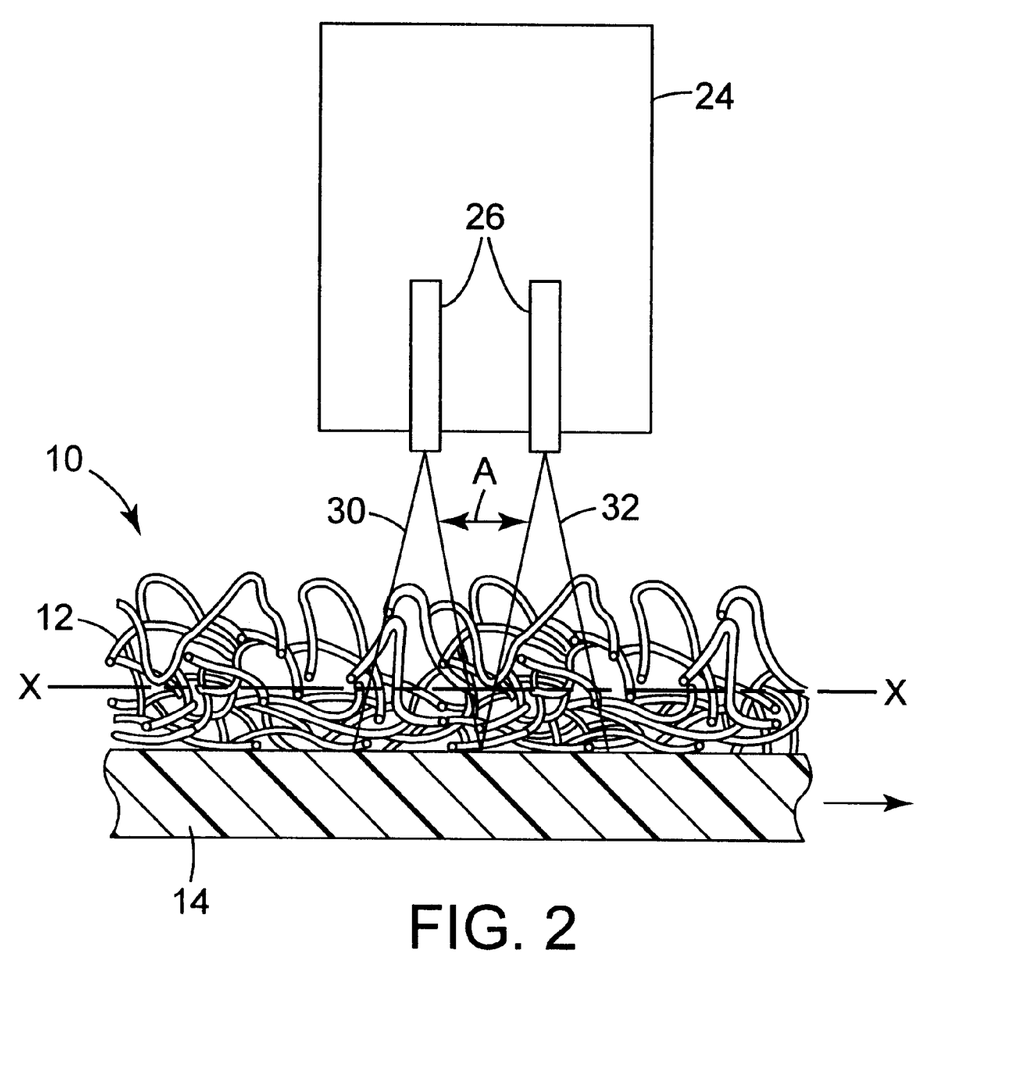
FIG. 2 is a partial cross sectional view of the mat material located just under one color head of an ink jet apparatus with the color head positioned to define an image projection surface within the three dimensional structure of the mat material.
Figure 3:
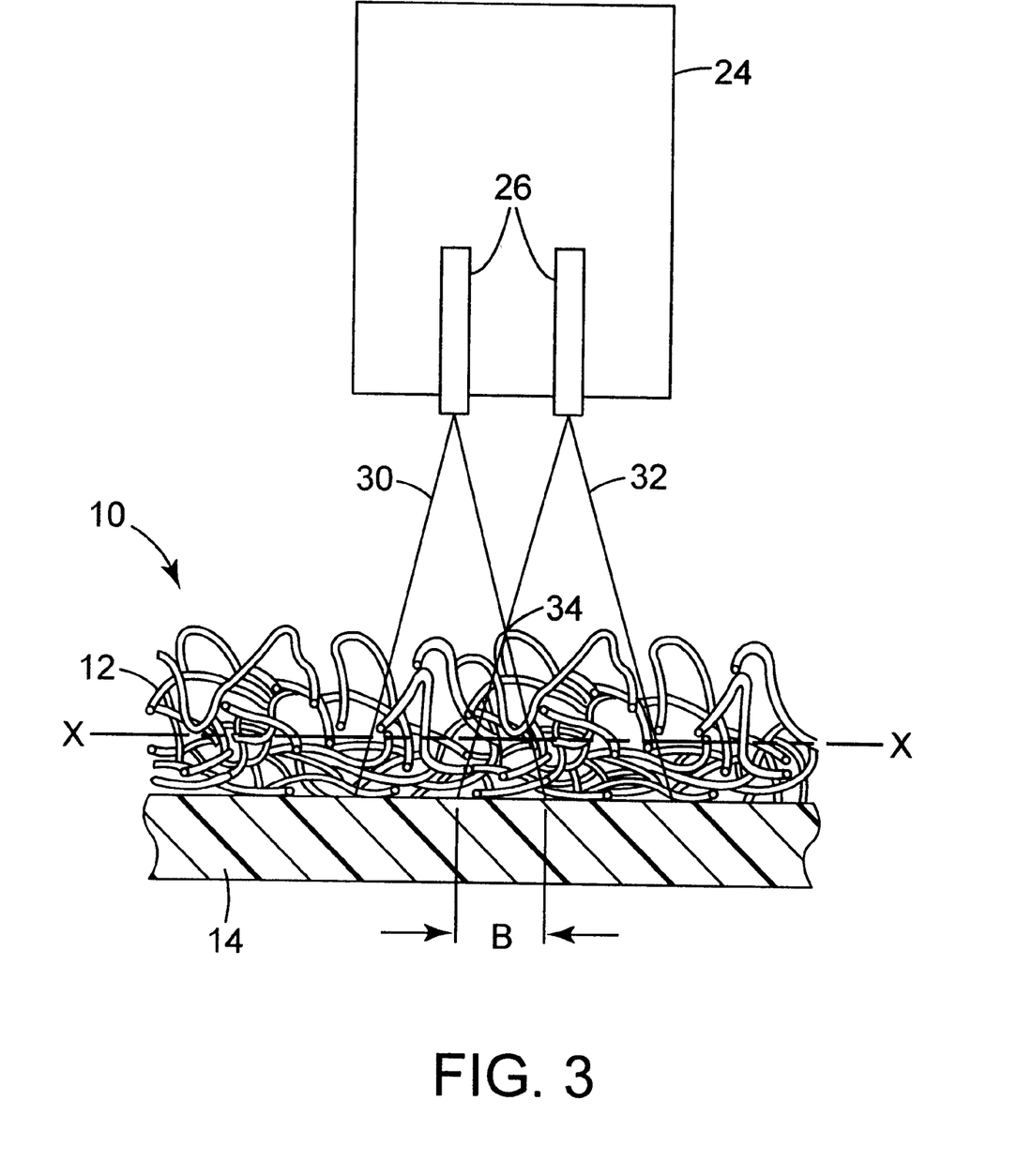
FIG. 3 is a partial cross sectional view similar to FIG. 2 but with the color head adjusted so that an overlap area is created at the image projection surface in accordance with the present invention.

As shown best in FIGS. 2 and 3, a mat 10 to which the present method can be applied includes a high loft web material 12 laminated with a flexible sheet-like substrate 14. Such a laminate construction is preferred for the creation of a dimensionally stable mat material suited for use as a floor covering. Such a laminate construction, however, is not required in accordance with the present invention.

Figure 4:
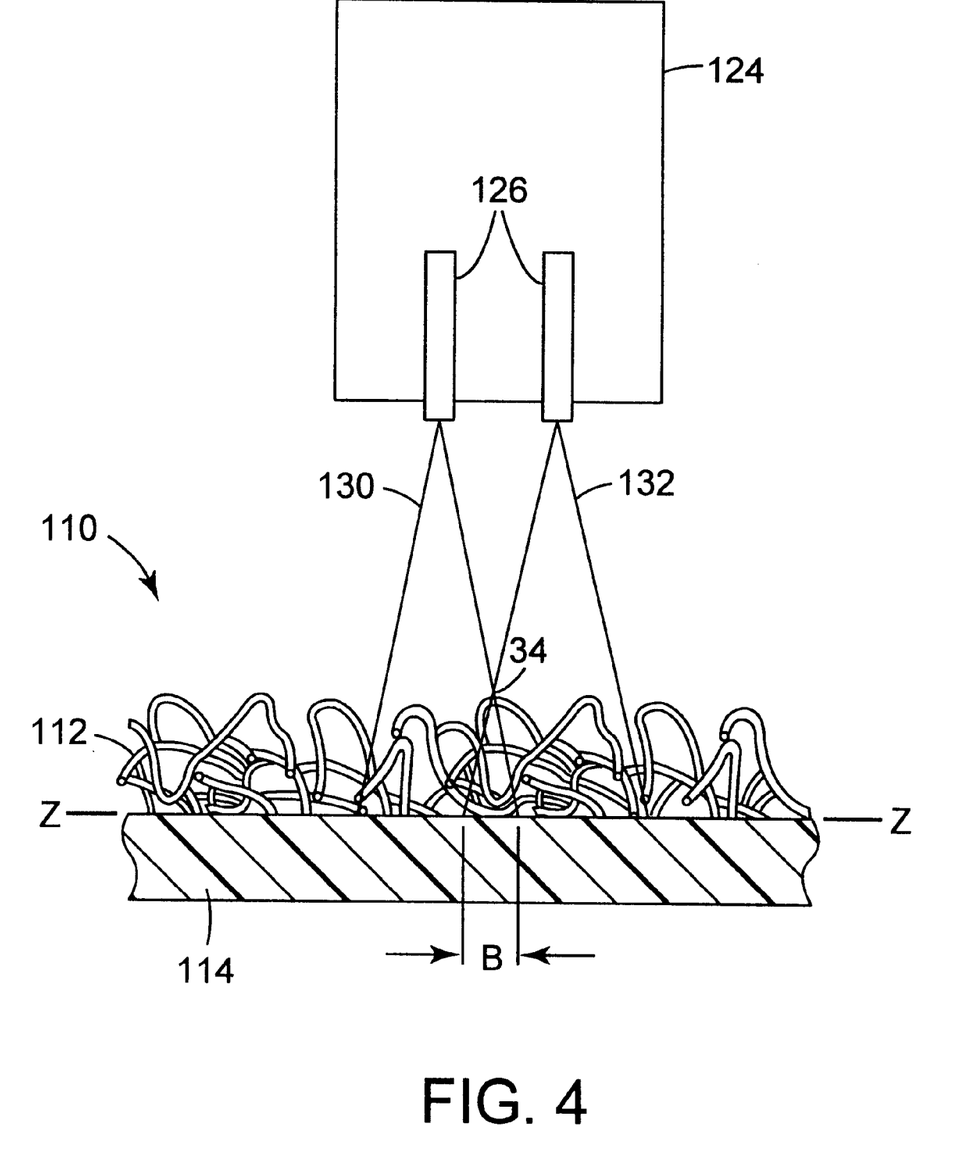
FIG. 4 is a partial cross sectional view similar to FIG. 3 but showing an open structure that extends down to a flexible layer laminate and with the color head adjusted so that an overlap area is created at the image projection surface in accordance with the present invention.

The illustrated embodiment of a high loft web material 12 comprises a coiled structure made up by coils of extruded continuous monofilaments of preferably thermoplastic material. The filaments are crinkled and interengaged to provide a crush resistant resilient mat having substantial integrity. As illustrated, the density of the filaments at the lower side of web material 12 is considerably greater than the density of the upper portion. Moreover, at the upper portion, the density is sufficiently low to provide the high loft open structure which is preferred for such a mat material. A high loft material is preferably characterized by having a web thickness of greater than 0.0625 inch (1.6 mm), a void volume of fifty percent (50%) or more, and is comprised of fibers or filaments having linear densities of 200 denier per filament or more. Most preferably, the void volume is eighty percent (80%) or more. The high loft web material 12 can be made in accordance with the process described in the aforementioned U.S. Pat. Nos. 3,837,988 and 4,351,683 so that the back or lower surface is approximately one-fourth to one-third more dense than the front surface. The high loft web material may instead be characterized by other varied density structures or by a structure that is more open (as shown in FIG. 4) all the way through its thickness and of a similar density throughout.

Polymeric materials are preferred that are extrudable at elevated temperatures to form soft flexible continuous filaments, and which at lower temperatures provide the required stiffness, toughness, hand or feel and other physical characteristics of the web material. Examples of polymeric materials include polycarbonate, polyalkylene, polyester, polyvinyl chloride, polyamide, polyolefins and other resins. These polymers may be modified to contain additional plasticizers or softeners and may be otherwise modified by the addition of coloring agents, reinforcing agents, stabilizers, fillers or other additives. As will be more fully described below, preferred embodiments include the addition of suitable fillers and coloring agents to provide a white mat material suitable for imaging.

Yet another feature of the web material 12 is that the interentangled filaments of the high loft structure are spot welded throughout with one another. In accordance with the aforementioned method of making, such spot welds can be accomplished during the forming process whereby the filaments, when still at elevated temperatures, become heat bonded with one another at their intersection points. Moreover, it is preferable that the web material 12 also be coated with a bonding resin or other material. The purpose of such a bonding material is to more durably secure the filaments together, thereby increasing the structural integrity and dimensional stability of the mat material 12 and so as to extend the useful life of the mat 10. Suitable bonding materials are dependent on the polymeric material making up the filaments themselves. For example, where the filaments are comprised of a vinyl material, the bonding material can be a polyvinyl chloride plastisol, such as comprised of plasticized polyvinyl chloride resin.

The high loft web material 12 can be laminated to any variety of sheet like substrates 14 to form the laminated mat structure 10. To do this, the web material 12 may be laminated with the substrate 14 by way of a bonding agent. The lamination may be accomplished by adhesively attaching a substrate 14 to the web material 12 by conventional adhesives, preferably which are suitable with the materials forming the web material 12 and substrate 14. The flattened high density side of the web material 12 provides a good contact surface for lamination to the substrate 14. Alternatively, thermal, ultrasonic, or other bonding techniques may be utilized.

The structure of the mat 10, as described above and shown in FIGS. 2 and 3, exhibits a high loft structure which is substantially open throughout its thickness. Such a structure provides a three dimensional structure with surfaces provided at all levels throughout the thickness which are open to and to which ink may be applied in accordance with the method of the present invention, described below. In accordance with a preferred embodiment, the open structure can be characterized by having an open top surface and a void volume from the top surface to within its thickness. Preferably, the open area of the top surface and the void volume within the thickness of the open structure are each about fifty percent (50%) or more. Another suitable web material and mat construction to which the present invention is applicable is a thermally bonded coiled web structure, such as is disclosed in copending and commonly owned U.S. patent application Ser. No. 08/769,097, filed Dec. 18, 1996 to Martin et al, the entire contents of which is hereby incorporated by reference.

It is also understood that the present invention is applicable to other similar three dimensional structures of the type having an open structure in accordance with the above, but which may not necessarily be made of interentangled monofilaments. For example, such an open structure may be created with microfibers or staple length fibers deposited and entangled to provide such an open structure. A low density open non-woven fibrous mat structure to which the present invention can be applied is disclosed in commonly owned U.S. Pat. No. 2,958,593 to Hoover et al, the entire disclosure of which is also incorporated herein by reference.

A characteristic quality of a such a mat resides in its ability to hide dirt. That is, the web material 12 should be capable of easily receiving and obscuring dirt within its structure. Dirt receiving capability depends on the openness of the top surface defined by the web material 12 of a mat 10 and the size and volume of the voids within the web material 12. The obscuring ability is attained by the structure that provides the aforementioned top openness and void volume. By the structure of the web material 12, described above, the tops of the crimped monofilament coils provide obscuring structure. That is, while sufficient top openness and void volume is created, portions of each coil lie over and obscure the voids wherein dirt is received.

In accordance with the present invention, a mat material, such as described above, is imaged in a manner so as not to substantially degrade the aforementioned characteristics of such a mat material 10. Specifically, it is desirable that the open structure of the web material 12 not be significantly modified. That is, preferably the void volume is not changed by more than about 10 percent (10%). Also, it is preferable that the durability of the mat 10 also not be substantially changed. Specifically, the durability means both the structural durability of the mat material as well as an image durability. It is desirable not only that the mat 10 provide a sufficient useful life, but also that the image lasts as long as the mat's useful life. Moreover, the softness or hand and the resiliency of the mat 10 are also preferably not to be substantially changed after the imaging process. Softness is defined as the resistance of the material to compression. The less the resistance, the softer the material. Preferably, the process of the present invention does not significantly affect the softness of the web material 12, but also preferably does not significantly change the modulus and recovery capabilities of the web material 12. Together, the modulus, recovery and softness provide the hand or feel of the web material 12 as applied to the material 10.

Figure 1:
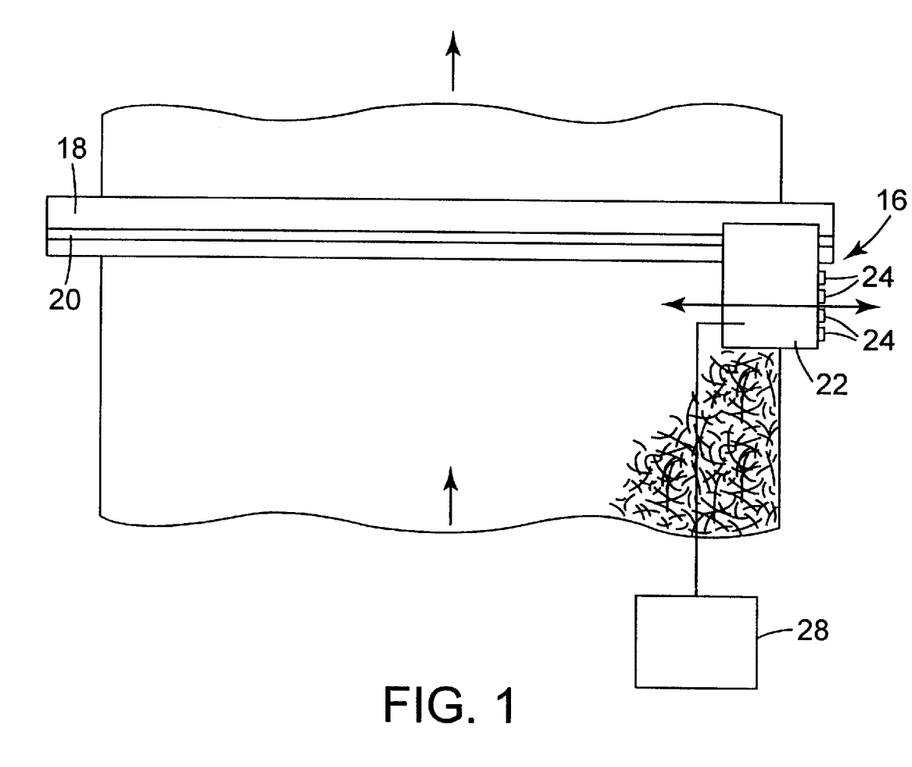
FIG. 1 is a schematic illustration of a top view of an ink jet apparatus usable in the method of the present invention for imaging a high loft mat material.

With reference to FIG. 1, one basic process for imaging a mat material 10 in accordance with the above is schematically illustrated. An open structured mat 10 is shown to be advanced through an ink jet type printing apparatus illustrated schematically at 16. A suitable machine usable in accordance with the present invention is a SCITEX™ Outboard printer. The ink jet printer 16 typically comprises a transverse guide assembly 18 having a guide rail 20 over which a carriage 22 moves in both transverse directions. The carriage 22 is typically connected to a drive mechanism (not shown) for moving it in both transverse directions at a speed commensurate with the printing process. Color heads 24, described below, are supported on the carriage 22. Moreover, the ink jet printer 16 also typically includes a conveying means (not shown) for indexing the web material, such as mat 10, at a preset process speed under the guide assembly 18. Moreover, the indexing is controlled so that the web material remains in a stationary position while the carriage 22 and its color heads 24 are passed transversely over the web and while printing of the web is done. Then, the web is indexed forward by a predetermined amount for the next pass of the carriage 22 and a next printing operation. The ink jet printer 16 preferably performs a printing operation during each transverse pass over the web material.

Figure 8:
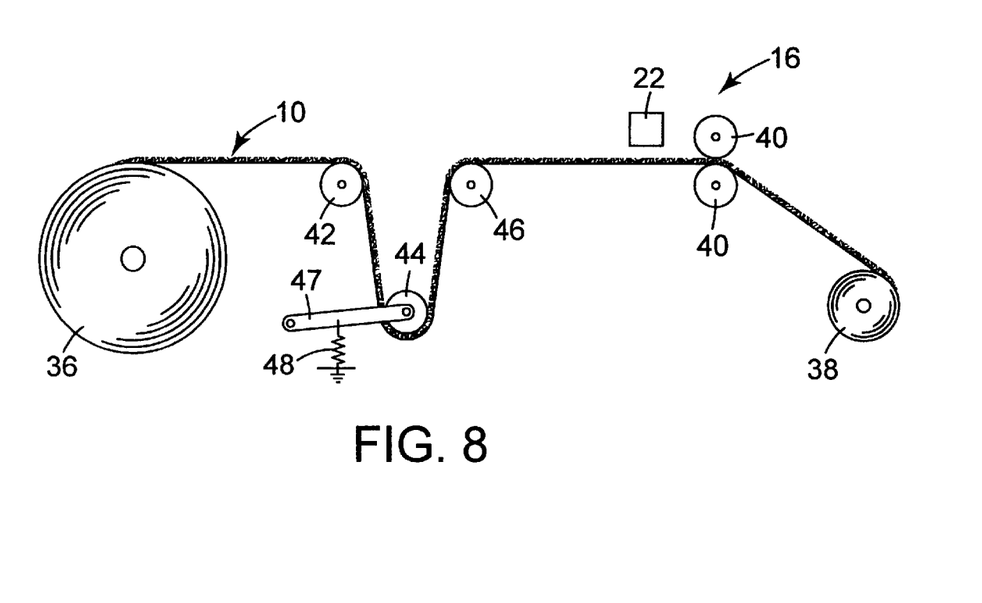
FIG. 8 is a side schematic view of one manner of running a mat material through a printing apparatus in accordance with the present invention.
Figure 9:
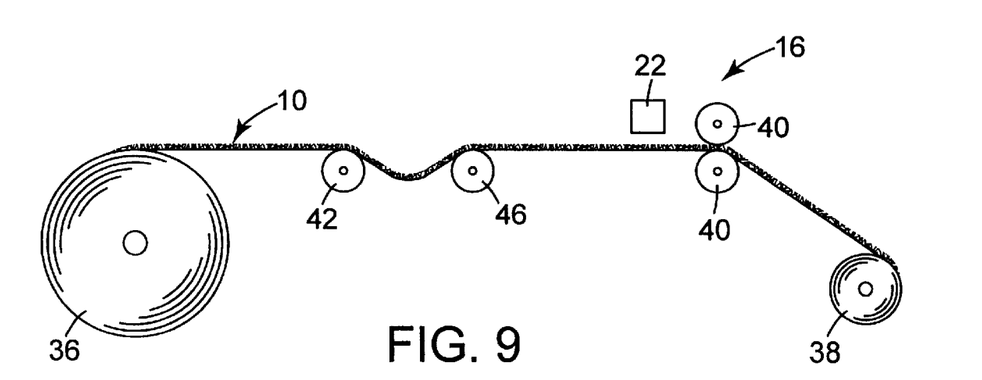
FIG. 9 is a side schematic view similar to FIG. 8, but showing a different manner of running a mat material through a printing apparatus which is particularly suited for imaging a mat material that is stretchable in the machine direction.

As shown in FIG. 8, the mat 10 can be supplied as a roll 36 and fed under the carriage 22 of the ink jet printer 16 for imaging. After imaging, the mat can be wound into a product roll 38. The mat 10 can be indexed along, or otherwise driven, by at least one feed roller, a plurality of which are shown at 40. One or more of the feed rollers 40 can be conventionally driven in accordance with the printing operation. If the material of the mat 10 is substantially unstretchable in the machine direction, the mat 10 can be wound over a first free roller 42, a dancer roller 44 and a second free roller 46. The dancer roller 44 is shown rotationally supported on a dancer arm 47, which in turn is preferably biased by a tensioning device 48 so as to provide an even tension to the material of mat 10 as it moves through the ink jet printer 16. However, in the case of imaging a material of the mat 10 that is significantly stretchable, the manner of running the mat 10 through the ink jet printer 16 shown in FIG. 9 may be preferable. In this case, the mat 10, provided from a roll 36, runs over the free rollers 42 and 46 without being threaded about a dancer roller. Thus, a tensile force is not created within the material of mat 10 prior to or during the printing operation (other than the weight of the material itself acting against forward movement). More preferably, a sag of the material of mat 10 is provided between the free rollers 42 and 46 so as to further relieve tension from the mat 10 prior to and during the printing operation. The sag is preferably not too large so as to significantly add to the weight effect of the mat 10 as it is driven forward. With a significantly stretchable material excess tension can cause unwanted distortion of an image as applied to the material. The mat 10 can alternatively be fed into the ink jet printer 16 as a precut mat; that is, as a single sheet instead of from a roll. In any case, the above tension relieving techniques can also be utilized.

Referring back to FIG. 1, the carriage 22 supports a plurality of color heads 24. The number of color heads 24 (four are shown) depends on the number of colors that are to be applied. In accordance with the present invention, at least one color head 24 is provided so that a continuous tone image of unlimited shades of that color can be produced. Preferably, plural color heads 24 are provided in order to provide at least one perceivable color in addition to those being printed. More preferably, three color heads 24 are utilized so that a full color continuous tone image can be produced onto the web material 10 (which itself is preferably white). Specifically, a system used to generate a full color imaging is equipped with color heads 24 for printing either three colors (for example, cyan, magenta, and yellow) or four colors (for example, cyan, magenta, yellow and black). As shown in FIG. 2, each color head 24 also normally includes more than one cannon 26 from which a particular color is ejected. The color head 24 illustrated in FIG. 2 is equipped with two such color cannons 26. More or fewer cannons 26 can be provided with the understanding that machines are typically provided with between two and four ink jet cannons per color head 24. Furthermore, the construction and operation of the cannons themselves is well known in the ink jet printing art, so they are not specifically described herein.

As exemplified in FIG. 1, for each pass of the carriage 22, four color heads 24 pass over the material 10. Moreover, each color head 24 includes some number of ink jet cannons 26. Thus, a number of printed lines, equal to the total number of ink jet cannons 26 provided on the color heads 24, can be printed for each pass of carriage 22 over the material 10.

Each of the color heads 24 is supplied with ink from a separate ink source (not shown) of its respective color. Moreover, the ink is individually supplied to each of the ink jet cannons 26. Each ink jet cannon 26 ejects a continuous stream of ink drops, as well understood in the ink jet printing art, and the ink drops are recirculated within the ink jet cannon unless the ink drops are electro-magnetically deflected toward the surface of the material to be printed. Such electro-magnetic deflection is controlled by an electronic control system schematically illustrated at 28 in FIG. 1. The control system 28 provides the appropriate signals to each ink jet cannon 26 of each color head 24 so that the appropriate color is applied over the appropriate distance during movement of the carriage 22 based on the image to be provided. Such control systems are well known.

The electronic control system 28 is preferably PC-based. An image to be applied to the mat 10 can be provided to the PC in any number of known ways. In any case, the image is stored within the electronic control system 28 in a digitized format wherein the image is broken down into the three or four colors that are necessary in order to provide the desired full color image. For example, an image may be scanned by known scanning equipment into such a PC-based system. Then, the image is digitized and separated into its three or four constituent colors. This information is then provided by way of the electronic control system 28 to the ink jet cannons 26 of each color head 24 so that ink is applied in a predetermined pattern along each specific line applied to web 10. Once the lines are eventually completed with the three or four colors applied over one another, a full color image is completed on the material 10. It is noted that such a digitized image is broken down into pixels (each pixel made up itself of a matrix of dots, e.g. a 7×7 matrix in the case of the noted SCITEX™ Outboard printer). As part of this type of imaging process, each pixel is enlarged for application to a significantly wider web material, such as the material 10. Thus, the original image is broken down into pixels, each pixel is enlarged in accordance with the desired application and the pixels are projected onto the mat to be printed in a precise manner so that the image is built onto the web material. The correspondence of the image stored to the image applied on a pixel-by-pixel basis will be further described below.

As described above, full color printing is accomplished by the application of three or four basic colors from which an infinite color image can be produced on the substrate. Inks that are used to accomplish full color printing may be transparent inks or opaque inks. It is also noted that in accordance with the present invention other pigments or dyes may be applied so long as the aforementioned mat characteristics are obtained. Moreover, with any ink, it is preferable that the ink have good compatibility with the substrate. Specifically, the ink should have good adhesion and wetability to the material of the material 10. The ink must also be of a viscosity that permits it to pass through the specific equipment by which it is to be applied. In the case of an ink jet printer, the ink must also be conductive. In accordance with one preferred version of the present invention, the mat 10 comprises the web material 12 which is formed from vinyl. Preferable inks, thus, include vinyl-based inks. Preferably, the ink has a sufficient modulus so as not to negatively affect the softness and hand of the web material 12 in a significant way, but also so as to ensure that the image is as durable and lasts as long as the material 10.

It is also preferable that at least the web material 12 of mat 10 be comprised of a neutral white color material. Having such a neutral white background in combination with the use of a transparent ink is one important way that can be utilized to provide the ability to image such a three dimensional structure and to obtain a sharp enough full color image. More specifically, the white color provides an adequate level of reflectivity. In this respect, it has been found that an image can be effectively provided on a material having fifteen percent (15%) white. More preferably, materials are utilized having greater than sixty percent (60%) white. To determine percentage of white, a continuous tone gray scale was created and printed on a sheet of paper ranging from white to near black. An image was printed over the gray scale, and the point along the gray scale where the image becomes effectively perceptible was noted. The whiteness was then determined on a non-imaged but similar gray scale at the same point by utilizing a green tristimulus filter because it most closely matches the perception of the human eye.

The web material 12 itself may be comprised of a white polymeric material. Specifically, the desired polymer, such as vinyl, can be filled with rutile titanium dioxide ($TiO_2$) or other filler to render the polymer white. Although the use of white matting material is contrary to the general use of such matting as a floor covering for the purpose of holding dirt and particles, a white background has been found of importance in the ability to provide a sufficiently clear full color image to such a three dimensional mat structure. More preferably, the flexible substrate 14 is also white and can be formed similarly as the above.

Alternatively, the mat 10 need not itself be composed of white material. At least a portion of the web material 12 of the mat 10 may be rendered white prior to the imaging process. Again, it would be important that the web material be rendered white in a way that does not significantly degrade the qualities of the mat, namely its softness, resiliency, durability and void volume. This, however, can be more easily accomplished than an imaging process in that clarity and resolution are not issues.

As yet another alternative, the web material 12 of the mat 10 may comprise a colorless, essentially transparent material. In the preferred embodiment, that means that the coils of the web material 12 would be colorless (no pigments or dyes being added to the material). Preferably then, the flexible substrate 14 would comprise a material that is white, as defined above. In this case, the white flexible substrate 14 provides the desired level of reflectivity that enhances the sharpness of an image provided to the material 10.

As noted above, the image, stored in its digitized pixelated format, is in a sense to be projected onto a substrate at an image surface. More specifically, the ink jet cannons 26 for an ink jet type printer eject the ink drops to the web material 10 in a manner to provide an image to the web material 10.

In order to obtain an image of sufficient clarity on a three dimensional substrate, such as the mat 10, the image must be applied in a manner within and at various levels of the three dimensional structure. That is, the ink making up an image is applied to the mat 10 so that the filament coils are printed at various levels within the open structure of mat 10, specifically within the structure of the web material 12. With ink jet printing, the tiny drops are applied as small dots on surfaces of the filaments significantly down into the three dimensional structure.

Figure 7:
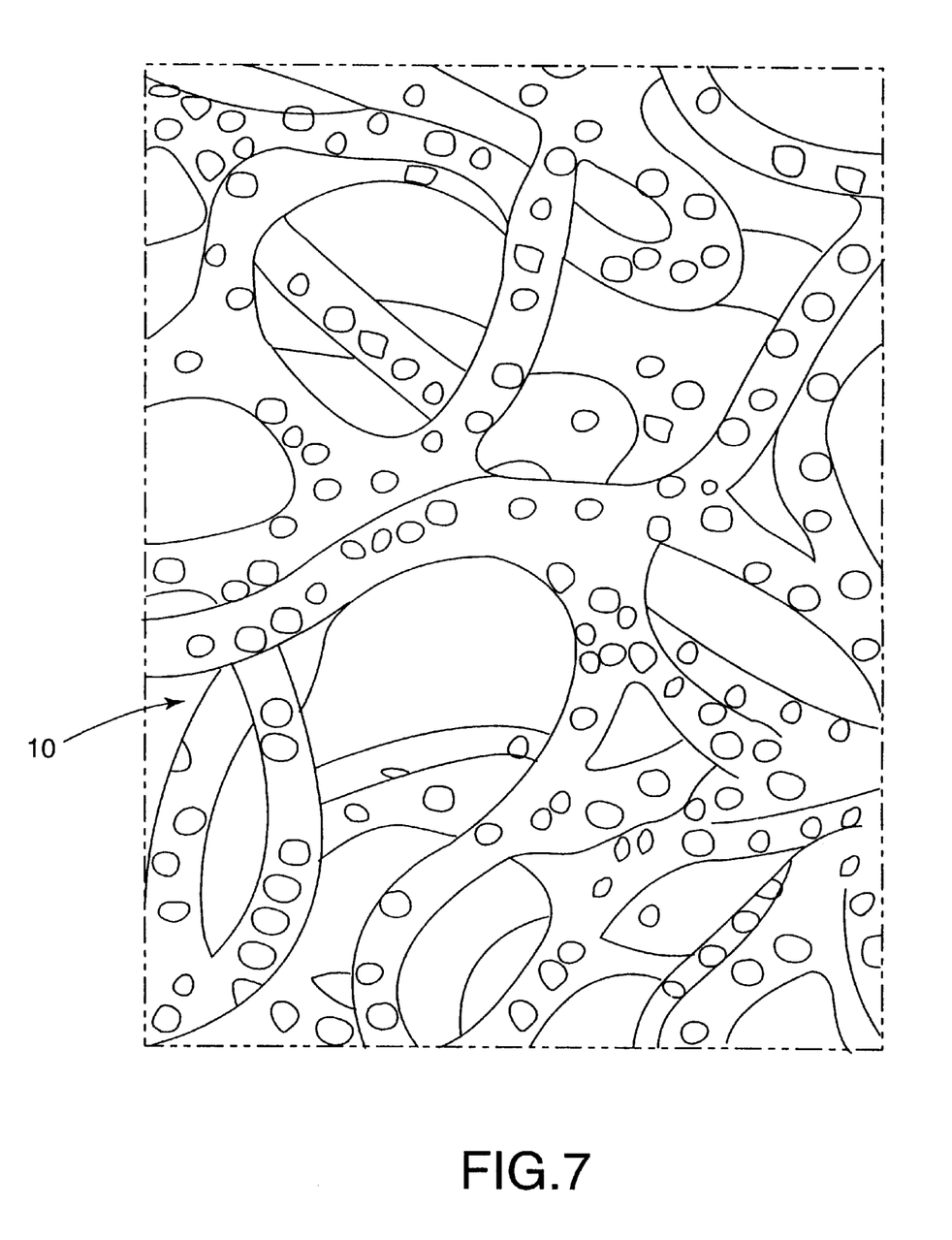
FIG. 7 is a top view of an imaged high loft mat material portion with ink dots representing multiple colors applied within the depth of the open three dimensional structure in accordance with the present invention.

A portion of a mat 10, in accordance with the present invention, having multi-colored ink drops provided on printable surfaces within the open three dimensional structure and at various levels of the web material 12 is shown in FIG. 7. Substantially the entire depth of the web material 12 is utilized in the making up of the total image. Thus, substantially the total depth contributes to the making of a sufficiently clear image. Clarity can be determined to be sufficient based upon the recognizability and aesthetic quality of the image. That is, the applied image is to be substantially similar to the original image from which it is based. Preferably, clarity not only includes the sharpness of the image in recognition, but also the "continuous tone" or full color perceivable range of the image.

Specifically, with reference to FIG. 2, the structure of web material 12 of mat 10 defines a projected image surface located at about the midlevel plane illustrated by the dashed line X—X. That is, in order for an image to be provided of sufficient clarity, ink should be applied down to that level and to the various surfaces of the filament coils that face toward the color head 24. For an open high loft structure to which the present invention is directed, the depth of printing is going to be substantially the same as the degree that the open three dimensional structure of the web material 12 extends within the thickness thereof. As shown with such a web material structure 12 having a densified lower portion, the depth level of the three dimensional open structure and thus of the printing are preferably about sixty seven percent (67%) of the total thickness of the web material 12.

In FIG. 2, for example, the mat 10 moves from left to right. Moreover, the color head 24 connected with carriage 22 (not shown in FIG. 2) moves into and out of the plane of the paper. Thus, the two illustrated ink jet cannons 26 provide what can be characterized as two adjacent stripes onto mat 10 extending into and out of the plane of the drawing sheet. As also illustrated, the stripes are applied down to the projected image surface X—X. Some ink will likely be applied even deeper. More particularly, the ink jet cannons 26 each eject the ink in a stream of discrete droplets toward the material 10. The stream of drops, indicated generally at 30 and 32, typically define a substantially diverging stream. The diverging stream is exaggerated in the Figures for explanatory purposes. It is understood that practically any jet stream, whether comprises of droplets or a continuous stream, will experience at least slight divergence of the stream as you get further from its source. The divergence may occur, for example, as a primarily two-dimensional shape, i.e. to make a fan shape, or may occur so as to form a cone shape having a substantially circular or ellipsoidal cross-section. Moreover, the formed shape may be symmetrical or not depending on the way that the ink is ejected, i.e. a non-symmetrical fan shape is typically produced by the electro-magnetic deflection of ink jet printers.

At the projected image surface (normally the flat surface of a substrate), it is a fundamental design requirement that the diverging drop streams 30 and 32 be arranged just adjacent one another so that they converge very near a projected image surface. In the illustrated example, the drop streams 30 and 32 converge approximately at the projected image surface X—X. This is a fundamental principle because of the desirability to have a direct correspondence of the pixel stored within the electronic control system 28 of the ink jet printer 16 to an enlarged pixel to be provided at the projected image surface. In other words, when the image is digitized and broken down into pixels, the image is projected to a surface so that the pixels align in the same order and position with edges of adjacent pixels precisely aligned to one another without overlap.

In order to ensure that the drop streams 30 and 32 come together at the precise location so as to achieve the corresponding imagery discussed above, the color heads 24 are normally vertically adjustably connected to the carriage 22. By this adjustability, the color heads 24 can accommodate different thickness substrates for printing. Moreover, where a plurality of ink jet cannons 26 are provided, the plurality of ink jet cannons 26 are typically horizontally adjustable relative to one another. This adjustability is more important when more than two ink jet cannons 26 are provided so that the diverging drop streams can be evenly provided.

Again, for a three dimensional substrate such as the open mat 10, it is important that the image be provided within the thickness of the substrate to obtain a sufficiently clear image. Thus, the image needs to be projected within the thickness of the mat 10 substantially to the plane of line X—X. However, to obtain sufficient clarity but to abide by the principles of providing a corresponding full image to a surface, a problem results. That is, with reference to FIG. 2, as the color head 24 is moved into and out of the plane of the drawing sheet, the aforementioned color stripes are laid down onto the mat 10 with an uncolored surface area A inbetween the diverging drop streams 30 and 32 at the upper surface of material 10. The surface area A is missed by any color. The mat 10 would be indexed forward after a pass of the color head 24 so that the area to the left of drop stream 30 is next printed. Thus, it can be seen that a repeating stripe pattern of uncolored lines will be formed across the material 10.

In order to overcome this problem, the method in accordance with the present invention has been developed so as to eliminate the forming of these transverse uncolored lines. Specifically, as shown in FIG. 3, the color head 24 is adjusted further away from the mat 10 so that the diverging drop streams 30 and 32 now converge at the point indicated at 34 which is located at or just above the top side of the web material 10 defined by the tops of the coils of web material 12. By this, the uncolored surface area A, shown in FIG. 2, is eliminated. However, adjusting the color head 24 in this manner is adverse to the principle of forming a corresponding image on a direct pixel-to-pixel basis on a substrate.

Because the image needs to be projected within the three dimensional structure for clarity, but in order to obtain full coverage, a cross-over of the drop streams 30 and 32 occurs, as shown in FIG. 3. This cross-over occurs at 34 and extends within the structure of mat 10 down to about the projected image plane defined by line X—X. What this means is that even though the topmost surface of mat 10 is provided with a substantially corresponding image, the ink droplets applied to the filament portions within the overlap zone Y alter the image. This overlapping results in color being applied more heavily in the area defined by the overlap area B located within the plane defined by line X—X. In other words, the pixel to pixel edge to edge relationship discussed above, is compromised. That means the sharpness of the image caused by the overlapping of the pixels at the projected image level X—X is reduced. However, because of the ability to apply the ink, which are droplets in the case of an ink jet printer, to and within the open three dimensional structure, a clearer image is actually obtained. The aforementioned description applies specifically to those situations wherein plural ink jet cannons or other spraying devices are provided on a color head. In the case where only one ink jet cannon 26 or other type of nozzle is provided on a color head 24, the exact same application principles are applied as a function of the indexing operation of the mat 10. That is, in accordance with the present invention, the mat 10 should be indexed forward by an amount so that a diverging drop stream will be positioned such that it would converge with a drop stream provided just adjacent thereto above the upper most surface of the material 10. A similar overlap area B will be defined at the level of the projected image surface substantially defined at line X—X.

As shown in FIG. 4, a mat 110 comprising a high loft web material 112 is illustrated having an open three dimensional structure that is not densified at its lower portion. That is, the open structure extends throughout the total thickness of the web material 112. The projected image plane is illustrated at line Z—Z. Like the above embodiment, the image is applied within the total thickness of the web material 112. In this case the depth of printing is substantially one hundred percent (100%) of the thickness of the web material 112. Again, the image is made up of ink applied at various levels within the three dimensional high loft structure. The upper surface of the flexible substrate 114 may actually also contribute the area onto which ink is applied and to be included in the total image make-up. Furthermore, compensation must be provided for the same printing concerns detailed above. Although the level of the imaging is to be provided down to the plane of line Z—Z to produce a sufficiently clear image on such a high loft open three dimensional structure, an overlap needs to be provided at that level, shown at B, in order to accomplish complete printing at the surface of the web material 112. The other illustrated components are similar to those described above, but are labeled within the one hundred series.

Figure 5:
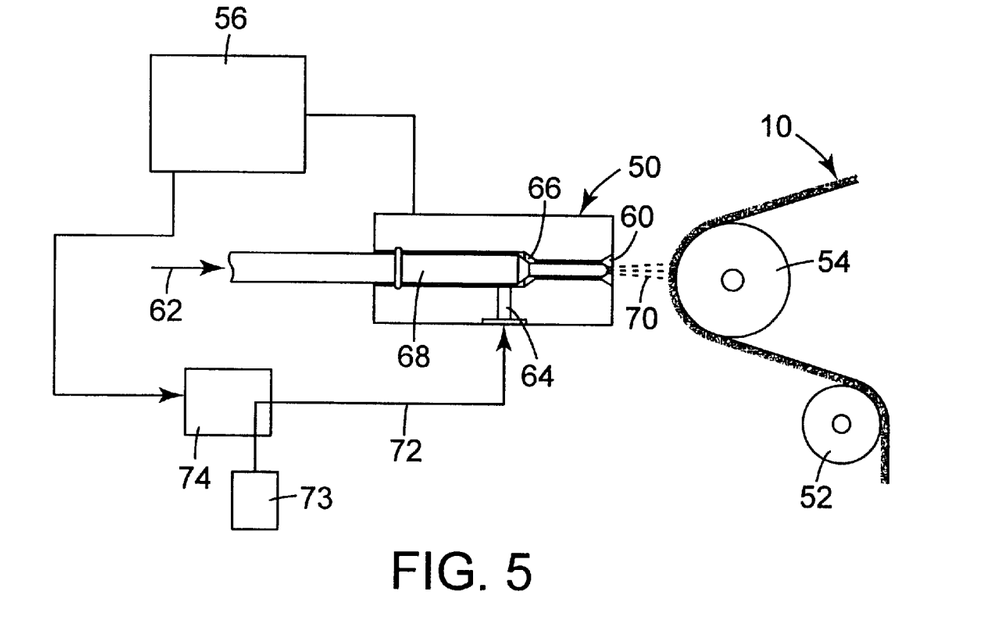
FIG. 5 is a schematic illustration of an air-brush type spraying apparatus also usable for imaging a high loft mat material in accordance with the method of the present invention.
Figure 6:
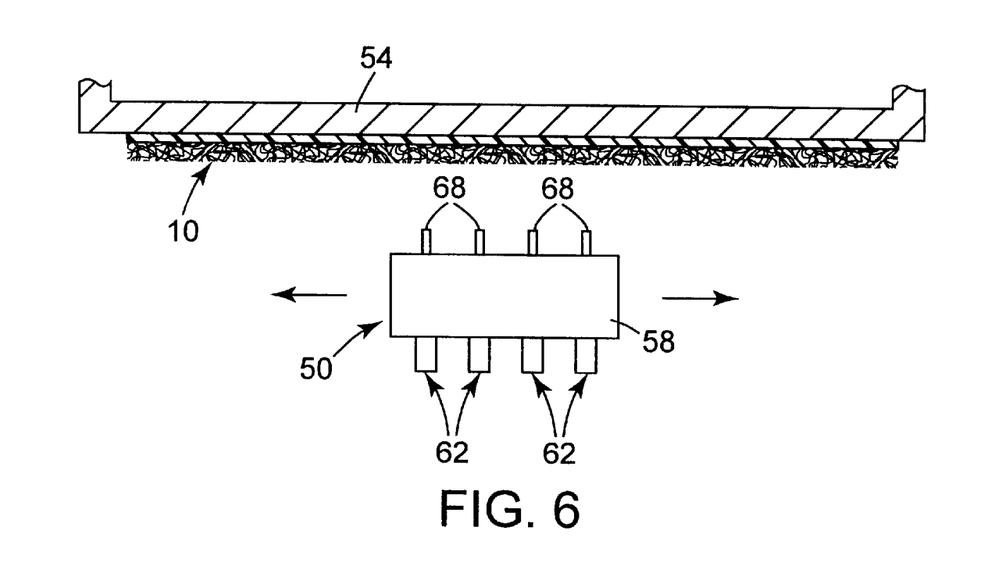
FIG. 6 is a schematic illustration showing the head movement of the apparatus of FIG. 5 relative to a cross section of the mat material and its supporting platen.

In FIGS. 5 and 6, a different type printing apparatus which is also suitable for use in accordance with the present invention is illustrated. More specifically, an air-brush type spraying mechanism is schematically illustrated for applying an ink, for example, to a material 10. Mat 10 can be substantially of the type described above. An example of a machine of this type is a Vutek Spray Jet Printer, Model No. 1660, which is manufactured by Vutek, Inc. of Meredith, N.H. In contrast to the ink jet printing apparatus 16 described above, this air-spray apparatus is designed to apply an image to a vertically disposed substrate.

To accomplish the method of the present invention, the mat 10 can be guided, for example, from a guide roller 52 along a platen roller 54 and subsequently further handled. The web is moved past the air-spray apparatus 50 so that an image can be provided to the three dimensional structure of the material 10. Alternatively, the mat 10 can be guided from one set of rollers to another so that the mat 10 is imaged in its span between the roller sets (instead of while lying against the platen roller 54). In any case, and similarly as in the ink jet printer 16 described above, the air-spray apparatus 50 is controlled by an electronic control system 56 for the application of a corresponding image from a digitized image onto the material 10.

The air-spray apparatus 50 comprises a carriage 58 which is movable back and forth transversely across the face of mat 10 as illustrated in FIG. 5. The carriage 58 supports a number of print heads 60 corresponding to the number of colors to be applied, with each print head 60 comprising one or more nozzles. Again, like the system described above, three or four colors may be provided with transparent inks for the purpose of providing a full color image within an infinite number of color variations. Alternatively, opaque inks may be used to provide multiple colors of any number for a particular imaging application. Each of the color nozzles 60 are provided with a separate ink input 62, as schematically illustrated.

With reference to FIG. 5, a brief operation of the spraying mechanism is described. For each nozzle 60, an air-inlet 64 is provided. An air pressure plenum 66 is defined within each nozzle connected with the air-inlet 64 and surrounding a portion of a needle 68. Ink from the ink input 62 passes within a passage of the needle 68 and through an opening at its very tip. Air pressure within the plenum 66 supplied via air-inlet 64 passes around a reduced diameter portion of the needle 68 and past the ink opening at the tip of needle 68. This action causes the ink to be ejected from the needle opening and carried onto material 10. This type of nozzle provides a similar substantially diverging drop stream 70 as the drop streams 30 and 32 discussed above with reference to the ink jet printer 16. In this type of apparatus, the drop stream is typically more conical.

To control the application of ink onto the mat 10, air pulses are provided to the air-input 64 via a line 72 from an air source 73. The air pulses supplied within line 72 are controlled by a modulator 74 that is in turn controlled by the electronic control system 56. In other words, the control system 56, based on the image to be applied, initiates the modulator to provide pulses of air for controlling the ejection of ink at precise moments.

An image is built up onto the mat 10 in substantially the same manner as that described above with reference to the ink jet printing type apparatus. That is, a series of colored inks are applied in lines as the mechanism moves in a transverse direction across the material 10. In order to provide the image of sufficient clarity on the three dimensional structure of mat 10, these lines are aligned in accordance with the principles discussed above and illustrated in FIG. 3. Again, with a single nozzle, the image clarity and overlaps are a function of the indexing of the mat 10 for each pass of the carriage 58.

It is further understood that other machines that apply inks, dyes or pigments may be utilized in accordance with the principles discussed above. Specifically, the mat characteristics are not to be degraded. Moreover, a sufficiently clear continuous tone image is to be provided within the three dimensional structure by applying ink sufficiently within the three dimensional structure including its top surface. It is also noted that the above-described bonding material, e.g., plastisol for a vinyl mat, may be applied before the imaging process and again after, may only be applied after, or may not be applied at all. Preferably, such a coating is provided, not only to improve the structural durability of the mat 10, but also to make the image more durable; that is, so that the image is not abraded from the mat. In the case of a mat comprising thermally bonded filaments, such as disclosed in U.S. patent application Ser. No. 08/769,097, although a binder is not necessary for structural integrity of the open coiled structure, a coating that is preferably compatible with the mat material may be applied after imaging to improve the durability of the image.

EXAMPLES

Example #1 The web used was prepared according to U.S. Pat. #4,351,683—Example #1 except the plastisol binder was:

| Ingredients | Generic Description | Trade Designation | Wt. % |
|---|---|---|---|
| Resin | Vinyl chloride-vinyl acetate copolymer dispersion resin | Formosa F-40 | 45.1 |
| Resin | Vinyl chloride-vinyl acetate copolymer blending resin | OXY 0567 | 10.0 |
| Plasticizer | Di-iso-nonyl phthalate | Jayflex DINP | 43.1 |
| Stabilizer | Barium, Zinc stabilizer | Ferro BH-191 | .8 |

-continued

| Ingredients | Generic Description | Trade Designation | Wt. % |
|---|---|---|---|
| Fungicide | 10,10-bis phenoxarsine(5% in DIDP plasticizer solution) | Vinyzene PB-3081 | 1.0 |

Formosa products are available from Formosa Plastics Corporation USA of Livingston, NJ; OXY products are available from Occidental Chemical Corporation of Pottstown, PA; Jayflex products are available from Exxon Chemical Company of Houston, Texas; Ferro products are available from Ferro Corporation of Walton Hills, OH; and Vinyzene products are available from Morton International, Inc. of Cinncinnati, OH.

The resulting matting material was printed with a digitized image of a 3M™Scotchgard™ fabric protector 10 oz. can using a Scitex "Outboard" Printing machine at 10 dpi resolution. It was necessary to modify the gap between the printing head and backup plate to allow the 0.4 inch (10.2 mm) thick mat to feed through the machine. The inks used were purchased from Imaje Ink Jet Printing Corporation, of Kennesaw, Ga.

| (1) | Magenta | product no. A13653 |
| (2) | Yellow | product no. A13657 |
| (3) | Cyan | product no. A13855 |
| (4) | Black | product no. A13659 |

The imaged mat was then roll coated again with the aforementioned plastisol binder and bonded in a forced air oven at 300° F. (150° C.) for 3 minutes to produce a durable imaged mat. By "durable imaged", it is meant that the mat life is approximately equal to that of the image life. By "Image Life", it is meant that point at which the image is degraded beyond easy recognition. Void volume and other mat characteristics remained substantially unchanged.

Example #2 The web used was prepared according to Example #1 and then backed according to U.S. Pat. #3,837,988. The only change was the foam backing formulation:

| Ingredients | Generic Description | Trade Designation | Wt. % |
|---|---|---|---|
| Resin | Vinyl chloride-vinyl acetate copolymer blending resin | OXY 0567 | 58.9 |
| Plasticizer | Di-iso-nonyl phthalate | Jayflex DINP | 36.9 |
| Stabilizer | Barium, Zinc stabilizer | Ferro BH-191 | .9 |
| Fungicide | 10,10-bis phenoxarsine(5% in DIDP plasticizer solution) | Vinyzene PB-3081 | 1.0 |
| Filler | Calcium Carbonate | Durarnite 14 | 1.0 |
| Surfactant | silicone surfactant | Silicone DC 1252 | 1.3 |

OXY products are available from Occidental Chemical Corporation of Pottstown, PA; Jayflex Products are available from Exxon Chemical Company of Houston, Texas; Ferro products are available from Ferro Corporation of Walton Hills, OH; Vinyzene products are available from Morton International, Inc. of Cinncinnati, OH; Hubercarb products are available from J.M. Huber Corp. of Quincey, Illinois; and Silicone DC is available from Dow Corning of Auburn, MI.

The resulting web was then printed with a digitized pattern according to Example#1 and coated with plastisol to produce a durable imaged mat. Void volume and other mat characteristics remained substantially unchanged.

Example #3 The web described in Example #1 was extruded according to U.S. Pat. #3,837,988 but not coated with a plastisol binder. The resulting unbonded web was then backed according to Example #2 and printed with a digitized image according to Example #1 of a 3M™ Scotchgard™ fabric protector 10 oz. can using a Scitex "Outboard" Printing machine at 10 dpi resolution. The resulting web was then coated with plastisol according to Example #1 to produce a durable imaged mat. Void volume and other mat characteristics remained substantially unchanged.

Example #4 The web described in Example #1 was extruded according to U.S. Pat. No. 3,837,988 but not coated with a plastisol binder. The resulting unbonded web was then backed according to Example #2 and printed with a digitized image according to Example #1 of a 3M™ Scotchgard™ fabric protector 10 oz. can using a Scitex "Outboard" Printing machine at 10 dpi resolution. No additional binder was applied to the mat. "Image Life" was about 20% of that of the mats post coated with plastisol (Examples #1–3). Void volume and other mat characteristics remained substantially unchanged.

Example #5 The web described in Example #1 was coated with the aforementioned plastisol binder. The resulting material was then printed with the digitized image of a clown using a Vutek Spray Jet Printer Model #1660. The inks used are of the following general formulation:

| Ingredients | Generic Description | Wt % |
|---|---|---|
| Solvent | 1-methoxy-2-propyl acetate | 40–70 |
| | Diethylene glycol monoethyl ether acetate | 15–40 |
| | Cyclohexanone | 7–13 |
| Pigment | Copper phthalocyanine blue | 1–5 |
| Polymer | Vinyl acetate-vinyl alcohol-vinyl chloride polymer | 1–5 |
| | Ethyl acrylate | <.7 |

A clown image was produced on the mat at 9 dpi. The imaged mat was then roll coated again with the aforementioned plastisol binder and bonded in a forced air oven at 300° F. (150° C.) for 3 minutes to produce a durable imaged mat. Void volume and other mat characteristics remained substantially unchanged.

Example #6 A coextruded web was prepared and laminated to a backing according to U.S. patent application Ser. No. 08/769,723, thermally bonded in a circulating air oven at 300° F., and printed according to Example #1. No binder or protective coating was applied after the imaging step. Void volume and other mat characteristics remained substantially unchanged, except that the image durability was lessened.

We claim:

1. An imaged high loft mat product comprising:
  a high loft web material having a first major surface and a three dimensional open structure that extends at least partially within the thickness of the web material from the first major surface, the first major surface characterized by having an open structure, and the three dimensional open structure having printable surfaces thereof provided at various levels within the thickness of the web material;
  a continuous tone image applied over at least a portion of the mat product, wherein a perceptible image is visible when said first major surface of said web material is viewed, and said perceptible image is created by the application of at least one color of ink to printable surfaces of the three dimensional open structure at various levels within the three dimensional open structure of said web material, and wherein a void volume of an imaged portion of the web material that has ink applied thereto for defining said image is substantially similar to a void volume of three dimensional open structure of a non-imaged portion of the web material.

2. The imaged mat product of claim 1, further including a flexible substrate bonded to the web material.

3. The imaged mat product of claim 2, wherein the web material includes a three dimensional open structure all the way through its thickness, and the ink is applied onto printable surfaces of the open three dimensional structure throughout its thickness and to portions of a surface of the flexible substrate.

4. The imaged mat product of claim 2, wherein the web material includes an three dimensional open structure at least halfway through its thickness, and which is more dense within its thickness at a region thereof adjacent to an interface between the web material and the flexible substrate, and the ink is applied onto printable surfaces of the open three dimensional structure above the densified region and to portions of the densified region that face away from the interface.

5. The imaged mat product of claim 2, wherein the web material comprises a white web material portion onto which the image is applied.

6. The imaged mat product of claim 5, wherein the web material is itself composed of a white material.

7. The imaged mat product of claim 2, wherein the web material is composed of a colorless material, and a white flexible substrate is bonded to the web material.

8. The imaged mat product of claim 1, wherein the three dimensional open structure of the web material is comprised of plural coils so that the three dimensional open structure is characterized by having a void volume of at least 50%.

9. The imaged mat product of claim 1, wherein the image comprises plural different color inks which are applied so as to produce at least one additional color within the continuous tone image.

10. The imaged mat product of claim 1, wherein the image comprises a full color image including at least three different color transparent inks applied to the web material so that a continuous tone image is produced.

11. The imaged mat product of claim 10, wherein an overlap area is provided of a same color in one direction of the web material on the three dimensional open structure at a level within the thickness of the web material, and wherein the first major surface of the web material is effectively imaged.

12. The imaged mat product of claim 11, further including a plastisol coating over the image for improved durability.

* * * * *

UNITED STATES PATENT AND TRADEMARK OFFICE
CERTIFICATE OF CORRECTION

PATENT NO.   : 6,013,347
DATED        : January 11, 2000
INVENTOR(S)  : Philip G. Martin, Gary L. Olson, Gerald A. Ridlehoover, and Randall R. Schickler It is certified that error appears in the above-identified patent and that said Letters Patent is hereby corrected as shown below:

Title Page,
References Cited, U.S. Patent Documents, please add the following U.S. Patent Documents:

| | | |
|---|---|---|
| --2,958,593 | 11/1960 | Hoover, et al.-- |
| --3,837,988 | 09/1974 | Hennen, et al.-- |
| --4,351,683 | 09/1982 | Kusilek-- |
| --4,547,786 | 10/1985 | Logan, et al.-- |
| --4,820,566 | 04/1989 | Heine, et al.-- |
| --4,979,380 | 12/1990 | Robbins et al.-- |
| --5,458,590 | 10/1995 | Schleinz et al.-- |
| --5,503,076 | 04/1996 | Yeo-- |
| --5,612,118 | 03/1997 | Schleinz et al.-- |

Title Page,
References Cited, After all U.S. Patent Documents, please add the following:
--FOREIGN PATENT DOCUMENTS--

| | | |
|---|---|---|
| --1 515 115 | 06/1978 | Great Britain-- |
| --904,560 | 07/1986 | Belgium-- |
| --0 646 460 | 04/1995 | Europe-- |
| --0 705 707 | 04/1996 | Europe-- |
| --2 090 819 | 01/1972 | France-- |
| --2 256 982 | 08/1975 | France-- |

Title Page,
References Cited, After all Foreign Patent Documents, please add the following:
--OTHER PUBLICATIONS--
--Brochure, NUR Bluboard by Nur Advanced Technologies--

Column 9,
Line 67, "material" should read --mat--.

Column 10,
Line 4, "material" should read --mat--.
Line 40, "material" should read --mat--.
Line 56, "material" should read --mat--.
Line 67, "material" should read --mat--.

UNITED STATES PATENT AND TRADEMARK OFFICE
CERTIFICATE OF CORRECTION

PATENT NO.   : 6,013,347
DATED         : January 11, 2000
INVENTOR(S) : Philip G. Martin, Gary L. Olson, Gerald A. Ridlehoover, and Randall R. Schickler It is certified that error appears in the above-identified patent and that said Letters Patent is hereby corrected as shown below:

Column 11,
Line 49, "material" should read --mat--.
Line 54, "material" should read --mat--.
Line 55, "material" should read --mat--.

Column 12,
Line 37, "material" should read --mat--.

Column 13,
Line 22, "material" should read --mat--.
Line 26, "material" should read --mat--.

Column 14,
Line 2, "material" should read --mat--.
Line 32, "material" should read --mat--.
Line 45, "material" should read --mat--.
Line 52, "material" should read --mat--.

Column 15,
Line 9, "material" should read --mat--.
Line 26, "material" should read --mat--.

Column 16,
Line 48, "Durarnite" should read --Duramite--.

Signed and Sealed this

Fourteenth Day of August, 2001

*Attest:*

*Attesting Officer*

NICHOLAS P. GODICI
*Acting Director of the United States Patent and Trademark Office*